Feb. 10, 1942.   R. O. BENDER   2,272,594
REFINING OF OIL
Filed Oct. 20, 1939
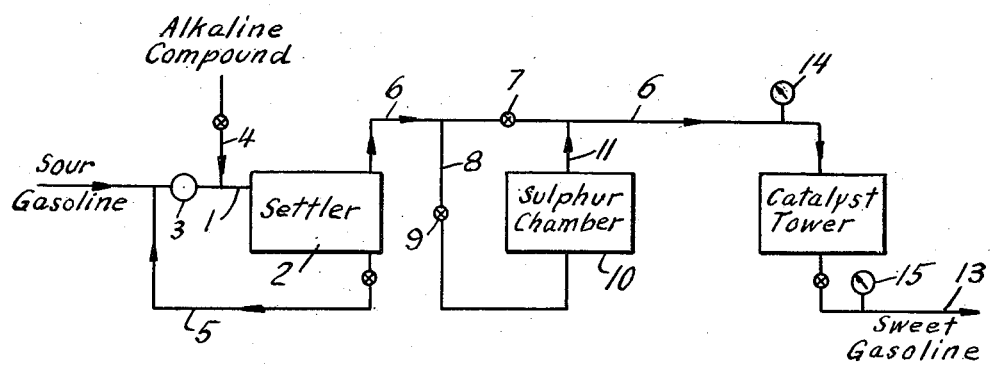
INVENTOR
Richard O. Bender
BY
ATTORNEYS Patented Feb. 10, 1942

2,272,594

UNITED STATES PATENT OFFICE 2,272,594

REFINING OF OIL

Richard O. Bender, Ridley Park, Pa., assignor to Sinclair Refining Company, New York, N. Y., a corporation of Maine Application October 20, 1939, Serial No. 300,439

12 Claims. (Cl. 196—30)

This invention relates to the refining of petroleum oils, particularly light distillates, to remove undesirable sulphur compounds therefrom, a process known as sweetening. My improved sweetening process is applicable to hydrocarbon distillates of high or low volatility, such as gasoline, kerosene, and furnace oils. It is especially useful in the treatment of furnace oils which are of relatively low volatility and which sometimes contain large quantities of undesirable sulphur compounds of a particularly refractory character.

My process is of the continuous type in which the oil to be sweetened, admixed with suitable reagents, is passed through a catalyst bed comprising preformed lead sulphide supported on an inert carrier adapted to resist packing. Briefly my process comprises incorporating in the oil to be sweetened an amount of elemental sulphur not exceeding, and preferably somewhat less than, the "theoretical" amount (i. e., the amount theoretically required to convert the mercaptan content of the oil to disulphides) and an alkaline compound in an amount slightly in excess of, but not substantially in excess of, that required to maintain the distillate in an alkaline condition, finely dispersing in the oil a small amount of free oxygen (or a gas mixture containing free oxygen such as air), and then passing the resulting mixture in contact with a preformed lead sulphide catalyst in the absence of undispersed water and undispersed oxygen. In the preferred form of my process a very small amount of finely dispersed water, preferably supplied as steam, is continuously or intermittently incorporated in the mixture passed in contact with the lead sulphide catalyst. Distillates sweetened by my process satisfactorily pass the conventional doctor and sulphur tests and they are not corrosive. Furthermore the application of my process to gasoline has no significant adverse effect on its anti-knock properties. The process of my invention requires a minimum of simple and inexpensive equipment, does not require the use of large amounts of aqueous solutions with attendant evils, may be carried out continuously over prolonged periods of time without intervening regeneration of the catalyst, and has the further advantage that it is relatively free from critical control as to the amount of sulphur that may be added without danger of having active sulphur incorporated in the finished distillate.

In carrying out my process undispersed water, and even finely dispersed water in excessive quantities, should be excluded from the zone of catalyst contact as it greatly impairs the activity of the catalyst and also tends to cause packing of the catalyst bed. Similarly the presence of alkali in substantial excess should be avoided as a substantial excess of alkali also adversely affects the activity of the catalyst bed. Excess sulphur also should be avoided. Excess sulphur likewise poisons the catalyst bed and, by its presence in active form in the finished distillate, excess sulphur renders the sweetened distillate corrosive.

While I do not predicate my right to patent protection on the theory involved, the following theory appears to afford the best explanation of the results obtained under the many different conditions of operation that have been encountered in various applications of my process. The mercaptans, which comprise the most objectionable sulphur compounds in sour distillates and which are conventionally identified by the empirical formula RSH, are, in the presence of a lead sulphide catalyst, directly converted, either by elemental sulphur or oxygen, to disulphides in accordance with the following reactions:

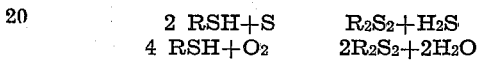

Under the conditions existing in my process the affinity of elemental sulphur for the mercaptans is somewhat greater than that of oxygen with the result that, if sulphur and oxygen each is present in an amount insufficient to complete conversion of the mercaptans present but more than adequate to complete this conversion by their joint action, all of the free sulphur and part of the oxygen will react leaving an excess of oxygen but no excess of sulphur. The oxygen reaction is not reversible. However, the sulphur reaction is reversible and since the generated hydrogen sulphide tends to accumulate in the catalyst bed, either by adsorption or some form of polarizing action, its accumulation soon reduces the efficiency of the catalyst to a degree rendering further operation impracticable for economic reasons.

I have found that this difficulty can be largely eliminated and the operation substantially prolonged without appreciable loss in efficiency, by dispersing through the distillate being treated a very small amount of an alkaline compound (e. g., .0003%–1.0% of an aqueous solution of caustic soda of 25° Bé.). The alkaline compound reacts with the hydrogen sulphide and permits continuation of the sweetening action by the elemental sulphur.

My process can be operated for substantial periods of time in the complete or substantially complete absence of water (for example using gaseous ammonia as the alkaline compound) and this form of operation is desirable when treating moderately sour distillates and using saw-dust as the carrier for the lead sulphide, since even small amounts of moisture promote packing. However, when treating very sour distillates water soluble salts, formed by the reaction of hydrogen sulphide with the alkali, accumulate in the catalyst bed at a significant rate. The accumulation of such salts material shortens the useful life of the catalyst between regenerations in such cases. I have found that this effect may be greatly offset by finely dispersing a small amount of moisture in the distillate to be treated, the moisture apparently acting as a washing agent to remove accumulated water soluble salts from the catalyst bed, thus prolonging its useful life.

One advantageous method of dispersing water through the distillate to be treated as it enters the catalyst contact zone is to introduce the required alkali as an aqueous alkali solution in the form of a jet arranged to impinge against a small jet of steam. The oxygen or oxygen-containing gas advantageously may be dispersed through the distillate to be treated by a similar procedure wherein the oxygen is substituted for or admixed with the steam. An alternative method of dispersing alkali, moisture and air, through the distillate involves forcing an aqueous alkali solution and air, with or without additional moisture in the form of steam, through a common line projecting into the stream of distillate passing to the catalyst contact zone and terminating in a small aperture through which the air and alkali solution are emitted together as a single jet.

The most advantageous extent to which a part of the sulphur requirement should be replaced by the provision of dispersed oxygen is governed by a number of factors. An increase in the extent of such replacement decreases both the amount of sulphur that must be supplied and the amount of hydrogen sulphide formed. This in turn decreases the amount of alkaline material required to prevent accumulation of hydrogen sulphide in the catalyst bed, as well as the accumulation of salts resulting from neutralization of the hydrogen sulphide. The useful life of the catalyst bed is thus prolonged notwithstanding the severe limitations on the permissible amount of moisture. Furthermore to the extent that the sulphur requirement is replaced by oxygen the danger of the presence of active sulphur in the treated product is reduced and the critical nature of the sulphur control eliminated. On the other hand the amount of oxygen that may be usefully employed by the necessity of maintaining the oxygen in a finely dispersed condition, by the progressive reduction in the capacity of the catalyst tower as the amount of oxygen is increased by the necessity of maintaining the catalyst in a wet condition, and by the loss of distillate through evaporation. When a substantial quantity of oxygen is used this loss may be particularly severe when treating volatile distillates such as gasoline and it is increased by the use of a gas mixture containing free oxygen, such as air, in lieu of relatively pure oxygen. However, this loss is of less significance in the treatment of materials of relatively low volatility such as furnace oil. The presence of free oxygen likewise increases the fire hazard. In general not more than about 30% of the sulphur requirements can with advantage be replaced by the use of oxygen.

I have found that lead sulphide deposited on saw-dust is an excellent low cost catalyst which offers substantial resistance to packing. A saw-dust carrier which I have found to be useful comprises saw-dust classified to pass through a 10-mesh screen but sufficiently coarse not to pass through a 20-mesh screen. The lead sulphide may be deposited on such a saw-dust carrier by admixing the saw-dust, wet with gasoline or other distillate, with litharge (PbO) in such proportions that the litharge comprises about 40–50% by weight of the mixture, then passing through a bed of this mixture in a suitable tower a charge of alkaline gasoline containing a substantial excess of elemental sulphur until the litharge is largely converted to lead sulphide as evidenced by the progressively increased sweetening of gasoline discharged from the bed. The catalyst thus produced, comprising about 40–50% lead sulphide, may then be used in a normal sweetening operation in which the use of excess sulphur in the charge is avoided. I have found, however, that the catalyst thus prepared usually does not remain active for a very long period but after initial reactivation it is in a condition to be used over long periods of activity between successive reactivations. Reactivation of spent catalyst may be effected by steaming the bed of catalyst for several hours, then washing the catalyst with water until substantially free from water soluble materials, removing and drying the catalyst, and subsequently replacing the catalyst in the catalyst tower. I have found that initial wetting of a saw-dust lead sulphide catalyst with gasoline reduces packing of the saw-dust carrier during subsequent normal operation. To insure such wetting of the dry catalyst it is desirable first to fill the catalyst chamber with gasoline, or equivalent distillate, and then to introduce the dry catalyst thus insuring thorough wetting.

An improved form of lead sulphide catalyst which I have found particularly useful and which, although more costly, is more efficient and more resistant to packing than the saw-dust lead sulphide catalyst above described, may be prepared in the following manner: Using as a base a material which is inert particularly with respect to alkali, which has a strong rigid structure and which when crushed presents a substantial superficial area, for example crushed blast furnace slag or carborundum sized to pass through a 6 mesh screen but to be retained on an 18 mesh screen, I take two-thirds of a measured amount of such base and immerse it in an aqueous solution of sodium metasilicate having a specific gravity of about 1.286 or heavier. I then quickly drain off any excess of the silicate solution which does not adhere to the base and place this wetted portion of the base together with the additional one-third of the measured amount of base material and a predetermined amount of litharge in a cement mixer which is rotated until a uniform exposed coating of the litharge on the base particles is obtained. The required amount of litharge must be added quickly since balling results if the litharge is added slowly. The litharge is then converted to lead sulphide in the manner previously described in connection with the saw-dust lead sulphide catalyst. A catalyst prepared in this manner may contain as high as 80% lead sulphide in final form and have an efficiency as high as 100% in excess of that of the saw-dust lead sulphide catalyst previously described. A catalytic bed of this material has a very low frictional resistance to the passage of relatively non-viscous distillates therethrough and has been found to be capable of operating almost indefinitely without significant packing. This improved form of lead sulphide catalyst is more fully described and claimed in my application Serial No. 369,217, filed December 9, 1940. One catalyst of this type which has been found to give especially satisfactory results was prepared from admixing 28% slag, sized as above described, 58% litharge and 14% of an aqueous solution of sodium metasilicate having a specific gravity of 1.286.

The alkalinity of the distillate subjected to the action of the catalyst should be controlled so that a slight excess is always available. By excess alkalinity I mean that the sweetened distillate after treatment with the catalyst should be slightly alkaline. For example, about 5-7 pounds of NaOH per thousand barrels of gasoline is usually satisfactory in the treatment of a moderately sour straight-run gasoline. Similarly I have found that 15-20 pounds of NaOH per thousand barrels of gasoline may be used with advantage for the treatment of reformed gasoline while the amount of alkaline compound should be still further increased when treating very sour polymer gasolines. Alkalinity may be imparted to the gasoline by ammonia in the gaseous state or in the form of aqueous ammonia, ammonia having the advantage of providing great flexibility in the control of the alkalinity of the distillate.

The desired alkalinity may be imparted to the distillate wholly or in part by a preliminary lye washing operation in accordance with conventional refinery practice. When using a saw-dust lead sulphide catalyst and treating a moderately sour gasoline this method of imparting alkalinity may be employed with advantage as a means of reducing to a minimum the presence of moisture in the catalyst contact zone. When several successive catalyst zones are employed in carrying out my process limited alkalinity may be imparted to the distillate in advance of each successive stage thus minimizing the proportion of alkaline compound present at the initial catalyst contact.

The effectiveness of my sweetening process is not appreciably effected by variations in temperature and pressure. Therefore, it may be carried out with advantage at ordinary temperature and pressure although some improvement has been noted with the use of elevated temperatures. The maximum rate of charging alkaline distillate to the catalyzing zone may be readily determined by varying the charging rate under normal operating conditions. The charging rate is directly affected by the amount and refractory nature of undesirable sulphur compounds contained in the distillate. Increased size of the catalyst tower greatly increases the maximum charging rate. I have found that prolonged operation with a charging rate to the catalyst tower substantially in excess of that which will permit proper sweetening of the distillate will soon poison the catalyst. The existence of this condition is indicated during normal operation by a rapid falling off of the maximum sweetening rate.

Alternative arrangements of apparatus adapted to carry out my novel sweetening process are illustrated in the accompanying drawing in which Fig. 1 is a diagrammatic illustration of the relationship of the principal elements and of the path of the distillate and reagents therethrough this arrangement being useful with either the saw-dust lead sulphide catalyst or the improved form of lead sulphide catalyst herein described. Fig. 2 is a detailed view of one arrangement which has been found useful for dispersing NaOH, moisture and oxygen through the sour distillate entering the catalyzing zone. Fig. 3 is a diagrammatic illustration of a simplified arrangement which has proven particularly useful when employing the improved form of lead sulphide catalyst previously described. Fig. 4 is a detailed view of an alternative arrangement for dispersing alkali, air and moisture through the distillate to be treated. The process of my invention will be further described in connection with the drawing.

Referring to Fig. 1 a sour distillate, supplied through line 1, may be forced by pump 2 through line 3 into a settler 4. A controlled amount of alkaline compound, such, for example, as a solution of caustic soda or dry or aqueous ammonia or a mixture of both, is introduced into line 3 through line 5. The introduction of the mixture of alkaline compound and sour distillate into settler 4 permits separation of any excess of the alkaline compound and any entrained water from the distillate, and any such material settling from the distillate may advantageously be returned through line 6 for reintroduction into line 3. The alkaline distillate removed from the top of settler 4 through line 7 is thus substantially free from entrained moisture. This alkaline distillate enters line 8 and in part flows through back-pressure valve 9 to line 10. At least a portion of the alkaline distillate is by-passed around valve 9 through sulphur control valve 11 and thence through lines 12 and 13 into sulphur pot 14 containing elemental sulphur. Alkaline distillate containing dissolved sulphur leaves the top of sulphur pot 14 through line 15 and passes through line 16 to line 10 where it joins the main body of distillate flowing through back-pressure valve 9.

Alternatively alkaline distillate by-passed through sulphur control valve 11 may be discharged through line 17 into the duplicate sulphur pot 18 and discharged therefrom through line 19 to line 16; duplicate sulphur pots being provided to permit recharging of the pots with elemental sulphur without interruption of the sweetening process.

The alkaline distillate containing elemental sulphur which passes through line 10 then goes to the top of one of the catalyst towers 20 and 21. In the arrangement shown two catalyst towers are provided and these catalyst towers are fitted with connections adapted to permit the alkaline sulphur-containing distillate to be passed downwardly through either of these towers separately, through both of them in multiple, or serially first through either one and then through the other. Each of the catalyst towers 20 and 21 is provided near the bottom with a perforated tray adapted to support the catalyst bed and with manheads arranged to permit removal of the catalytic material for reactivation. When it is desired to operate the towers 20 and 21 in series, valves 22, 24, 25, 26 and 27 are opened while valves 28, 29, 30 and 31 are closed. The sour gasoline then flows from line 10 through lines 32 and 33 into the upper end of the tower 20 and from the lower end of tower 20 through lines 36, 37, 38 and 39 to the upper end of tower 21. From the lower end of tower 21 the sweetened distillate is discharged through lines 41, 42 and 43. Pressure gauges 50, 51 and 52 advantageously are provided to permit observation of the pressure drops through the towers 20 and 21.

In passing from line 33 to the upper end of tower 20 the sour distillate passes through T 34 which is illustrated in greater detail in Fig. 2. Through a flange at one end of this T 34 there extends a gas line 45 and an alkali line 46. The gas line 45 communicates with valved branch lines 54 and 55 through which may be supplied steam and oxygen, respectively.

As illustrative of one arrangement which has been found to give particularly satisfactory results in an apparatus in which 33 and 34 comprise a 4 inch line and a 4 inch T, respectively, the gas line 45 may consist of a ¼ inch pipe which has been drawn closed at the discharge end and then drilled axially to provide a discharge aperture 1/16 inch in diameter. The alkali line 46 may similarly comprise a ¼ inch pipe to the discharge end of which is attached a ⅛ inch steel tube upwardly curved and terminating in a horizontal plane extending along the axis of the discharge aperture of gas line 45. A brace 49 is provided to maintain the discharge ends of conduits 45 and 46 in fixed relationship. This arrangement has been found especially adapted for introducing NaOH and either oxygen or a mixture of oxygen and steam in limited amounts and in a very finely and uniformly dispersed state into the distillate flowing through line 33 and T 34. A limited amount of moisture, as steam, is supplied in this manner in addition to the NaOH and oxygen particularly when treating very sour distillates.

With very sour stocks complete sweetening requires a substantial reduction in the rate at which the distillate passes through the catalyst bed. This in turn minimizes the pressure drop through the bed due to frictional resistance. With such stocks the extent of packing that can be tolerated without attaining an objectionably high pressure drop is greater for this reason. Furthermore, since moisture promotes packing the moisture tolerance is greater for stocks which are very sour or more difficult to sweeten. When treating very sour distillates such that the moisture tolerance of the process is sufficiently high, all of the alkalinity may advantageously be supplied as an aqueous solution of NaOH or ammonia in the manner last described. Under these conditions the sour distillate from line 1 may be by-passed to line 8 through line 53 and the functions of lines 5 and settler 4 dispensed with entirely. This procedure may also be followed with advantage when treating moderately sour distillates when the size and nature of the catalyst bed are such as to permit a reasonable moisture tolerance.

A T 40 with an alkali line 48 and a gas line 47 having valved steam and oxygen branch lines 56 and 57, similar in construction to T 34 and its associated alkali, steam and oxygen lines, may be disposed in line 39 adjacent the inlet of tower 21. This arrangement permits injection of finely dispersed moisture, oxygen and alkali into the distillate entering tower 21 when tower 21 is being operated independently or in parallel with tower 20. When treating very sour distillates and operating towers 20 and 21 in series, a part of the required total amount of alkali is injected at this point in order to reduce the alkalinity at the point of initial catalyst contact and yet maintain the distillate in an alkaline condition throughout the period of catalyst contact.

It will be apparent that, although only two catalyst towers are illustrated in Fig. 1, additional catalyst towers may be used if desired and such additional catalyst towers may be operated in multiple with, or in series with, catalyst towers 20 and 21. Usually the progressively increasing pressure drop occasioned by the tendency of the catalyst bed to pack, particularly when using a saw-dust lead sulphide catalyst, renders the use of more than two towers in series undesirable. When two towers have been operated in series until the distillate is no longer sweetened and it is found that the pressure drop has not yet become objectionably high, a tower including a freshly activated charge of catalyst may be inserted in the #2 position and the sweetening operation continued using the partially spent catalyst previously employed in the #2 position in the #1 position.

The improved form of lead sulphide catalyst wherein an exposed lead sulphide coating is attached by a binder, such as sodium metasilicate to a carrier material of high structural strength, such as sized blast furnace slag, carborundum, or the like, has the ability to resist crushing even when incorporated in a catalyst bed of great depth. Moreover, this form of catalyst has an average density greater than that of the saw-dust lead sulphide type of catalyst and the extent to which disengagement of lead sulphide may occur also is more limited. Accordingly, the simplified arrangement illustrated in Fig. 3 of the drawing is presently preferred when using this improved form of catalyst. In this arrangement a single large catalyst contact tower 60 is used and this tower may be provided with a deep catalyst bed containing 100 cu. ft. or more of my improved catalyst. The sour distillate is supplied at 63 and passes to line 64. A portion is by-passed through one of the sulphur pots 61 and 62 in order to incorporate the desired predetermined amount of elemental sulphur in the distillate passing through line 64. From line 64 the distillate, containing elemental sulphur, passes to the lower end of tower 60 and thence upwardly through the catalyst bed disposed therein. An aqueous alkali solution and oxygen, in the form of air, are injected into the sour sulphur containing distillate as it enters tower 60 in such a manner as to produce a fine dispersion.

Details of the arrangement for injecting the alkali solution and air into the distillate entering tower 60 are illustrated in Fig. 4. As shown, a small air supply line 65 (which may be a ¼" pipe) projects into a section of the distillate supply conduit 64 (which may be 4" in diameter at this point). Air supply line 65 is closed at its discharge end but has a small aperture 67 (e. g., a 1/16" diameter drill hole) in one side adjacent the discharge end. This aperture preferably is positioned to discharge the air emitted therefrom in a direction opposed to the flow of distillate through conduit 64. An aqueous alkali solution supplied by line 66 is introduced into air line 65 and, together with the process air, is discharged through aperture 67. If dispersed moisture in addition to that incorporated in the aqueous alkali solution is desired, steam as well as air may be supplied to line 65.

The rate at which the alkali solution is supplied through line 66 may be controlled by a small proportioning device of conventional design. Pressure gauges 68 and 69 provide a check on the rate at which gaseous materials pass through aperture 67 by indicating the difference between the pressure on the entering and discharge sides of the aperture. The sweetened distillate leaves tower 60 through line 75. A flow meter 70 permits observation and control of the rate at which sour distillate is supplied to the catalyst tower, while pressure gauges 71 and 72 permit observation of the pressure drop through the tower at all times. Steam and water lines 73 and 74 and blow-down line 75 are provided for use in regenerating the catalyst bed.

Upward flow of the distillate through a single catalyst bed of substantial depth in this preferred form of my process has the advantage of further reducing the tendency of the catalyst bed to pack as well as the advantages of further increasing the efficiency of the sweetening operation and of simplifying the apparatus and the operation thereof. However, operations embodying this form of my process but with catalysts of lesser average density, less stability, and less structural strength than my improved form of lead sulphide catalyst herein described, encounter difficulties occasioned by crushing of the catalyst in the lower portion of the catalyst bed due to insufficient strength of the carrier material, and by entrainment of particles of the less dense composite catalyst and of lead sulphide particles which become disengaged from the carrier material.

The following specific example will serve to further illustrate the process of my invention as applied to a specific stock containing a high content of mercaptans of a particularly refractory nature. In this exemplary operation the catalyst consisted of lead sulphide coated on a carrier of crushed and sized blast furnace slag, using sodium metasilicate as above described. Only one relatively large catalyst contact tower was employed in this operation and the catalyst bed disposed therein contained 100 cu. ft. of the catalyst. The stock treated was a very sour furnace oil from a high sulphur crude, this furnace oil having a gravity of approximately 40° A. P. I., a boiling range of approximately 360—620° F., and a mercaptan content of about .02%. A portion of this stock was diverted through one of the sulphur pots at a rate controlled to incorporate the predetermined quantity of sulphur in the mixture. This mixture was then passed to the lower end of the catalyst tower and upwardly through the bed of catalyst disposed therein. All of the alkaline compound and all of the dispersed oxygen were introduced into the sulphur containing distillate at the inlet to the catalyst contact tower in the form of a jet. The oxygen was supplied in the form of air. An aqueous solution of sodium hydroxide of 25° Bé. supplied the alkalinity. No steam was used, as the water content of the aqueous alkali solution furnished sufficient moisture and the process air produced an adequate degree of dispersion. Operating in this manner the process continued satisfactorily to sweeten the sour furnace oil for 2352 hours during which 163,000 barrels of furnace oil were passed through the catalyst tower. During this period sulphur was used at an average rate of 25 pounds per 1000 barrels of oil treated. Alkalinity was maintained by supplying NaOH as an aqueous solution of 25° Bé. at an average rate sufficient to provide 35 pounds of NaOH per 1000 barrels of oil treated. Air was supplied at an average rate of 15 pounds per 1000 barrels of oil treated.

Although lead sulphide is a particularly advantageous catalyst in the process of my invention, the sulphides of the polyvalent metals are generally useful as catalysts in the process. For example, mercuric sulphide, bismuth sulphide, arsenic sulphide, cuplic sulphide, nickel sulphide and manganese sulphide can be used in place of lead sulphide in the sweetening process of my invention as previously described.

I claim:

1. A method of removing undesirable sulphur compounds from a petroleum distillate which comprises incorporating in the distillate an amount of elemental sulphur not exceeding the amount of elemental sulphur required to combine with said sulphur compounds but sufficient to combine with most of said sulphur compounds, an alkaline compound in an amount sufficient to render and maintain the distillate alkaline and finely dispersed oxygen, and passing the resulting alkaline distillate containing elemental sulphur and finely dispersed oxygen in intimate contact with a lead sulphide catalyst in the absence of undispersed water and in the presence of not more than a small amount of added finely dispersed water.

2. A method of removing undesirable sulphur compounds from a petroleum distillate which comprises incorporating in the distillate an amount of elemental sulphur not exceeding the amount of elemental sulphur required to combine with said sulphur compounds but sufficient to combine with most of said sulphur compounds, an amount of an alkaline compound sufficient to render and maintain the distillate alkaline and finely dispersed oxygen, and passing the resulting alkaline distillate containing elemental sulphur and finely dispersed oxygen in intimate contact with a catalyst comprising a sulphide of a polyvalent metal in the absence of undispersed water and in the presence of not more than a small amount of added finely dispersed water.

3. A method of removing undesirable sulphur compounds from a petroleum distillate which comprises incorporating in said distillate an amount of elemental sulphur not exceeding that required to combine with said sulphur compounds but sufficient to combine with most of said sulphur compounds, thereafter passing the resulting sulphur containing distillate in contact with a lead sulphide catalyst in the absence of undispersed water, and finely dispersing through the distillate immediately prior to its contact with said catalyst free oxygen and an alkali hydroxide by introducing them into said distillate in the form of impinging jets, the amount of alkali thus introduced being controlled to exceed but not substantially exceed that amount which will maintain the distillate alkaline throughout its contact with said catalyst.

4. A method of removing undesirable sulphur compounds from a petroleum distillate which comprises incorporating in the distillate an amount of elemental sulphur not exceeding the amount of elemental sulphur required to combine with said sulphur compounds but sufficient to combine with most of said sulphur compounds, an amount of an alkaline compound sufficient to render and maintain the distillate alkaline, and finely dispersed free oxygen, and passing the finely dispersed oxygen in intimate contact with a lead-sulphide catalyst in the absence of undispersed water and in the presence of a small amount of added finely dispersed water.

RICHARD O. BENDER.